Jan. 26, 1960   H. R. DAY, JR., ET AL   2,922,906
TARGET ELECTRODE ASSEMBLY
Filed Dec. 26, 1956

Inventors:
Harold R. Day Jr.,
Peter Wargo,
by Richard R. Brainard
Their Attorney.

United States Patent Office 2,922,906
Patented Jan. 26, 1960

2,922,906

TARGET ELECTRODE ASSEMBLY

Harold R. Day, Jr., Ballston Lake, and Peter Wargo, Schenectady, N.Y., assignors to General Electric Company, a corporation of New York Application December 26, 1956, Serial No. 630,683

6 Claims. (Cl. 313—65)

The present invention relates to an improved target electrode assembly and more particularly to an improved assembly of this type for producing a point-by-point electric charge pattern corresponding to a visual image or other information to be converted to electrical signals by scanning the target electrode with an electron beam.

In a known type of television camera tube, referred to as an "image orthicon," the target electrode assembly includes a thin glass membrane and a collector mesh of metal, closely spaced therefrom, with both the membrane and the mesh supported from their peripheries in drumhead fashion. Target electrodes of this type have been subject to an increase in resistivity after a substantial period of use, for example, in the order of several hundred hours. This increase in resistivity is considered to be due to a gradual depletion of the mobile ions, usually sodium ions, which account for the electric conduction from one face of the glass membrane to the other. This phenomenon which has been called "burn-in" results in a tendency for an after-image to be retained on the electrode for a period many times the frame repetition rate and the image is superimposed upon later scenes. Also, the prior art structure described above is not very rigid and is subject to microphonics.

Accordingly, it is an important object of the present invention to provide a new target electrode assembly which maintains its electrical characteristics over long periods of use and which at the same time is not subject to undesirable mechanical vibrations and resulting unwanted electrical signal modulations.

It is a further object of the present invention to provide an improved target electrode exhibiting greater sensitivity.

In accordance with a preferred embodiment of the present invention, a thin transparent membrane or film of magnesium oxide and a conducting mesh are supported from opposite sides of a relatively rigid glass mesh structure having a large number of closely spaced openings extending generally perpendicular to the membrane. The magnesium oxide may to advantage be produced by the reduction of a thin layer of metallic magnesium vaporized onto a fugitive supporting layer applied to one surface of the glass mesh. This structure is mechanically rigid and maintains relatively constant its electrical characteristics over long periods of use. It is considered that the conduction in a direction normal to the opposed faces of the magnesium oxide membrane is due to the transport of electrons rather than ions and there is no loss of available electrons in the membrane after long periods of use corresponding to the decrease in available mobile ions occurring in the glass membrane. In operation, a charge pattern is established on the magnesium oxide film in accordance with the secondary electrons emitted from the film in response to impingement thereon of electrons from a photocathode. Since the magnesium oxide film provides a high yield of secondary electrons, it results in a sensitive target electrode.

Further objects and advantages which characterize the present invention will become more apparent as the following description proceeds, reference being had to the accompanying drawing, and its scope will be pointed out in the appended claims.

In the drawing, Fig. 1 is an elevational view in section, schematically representing a camera tube of the type to which the present invention may be applied;

Figure 3:
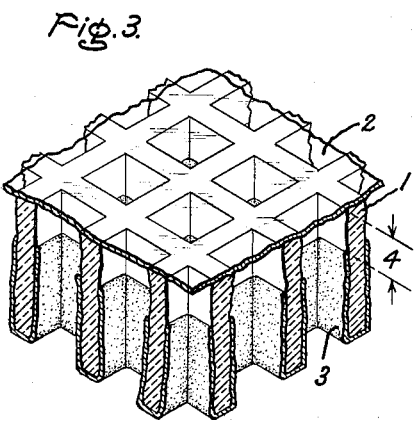
Fig. 3 is a perspective view, partially in section and greatly enlarged, showing the construction of the target electrode assembly of the present invention.

As best shown in Fig. 3, the target electrode assembly of the illustrated embodiment of the present invention includes a relatively rigid insulating support in the form of a glass mesh 1, on one face of which is supported a transparent membrane 2 of magnesium oxide which provides the target electrode and on the opposite side of which is the conducting mesh or collector electrode 3. The glass mesh 1 may have in the order of 10,000 to 360,000 openings per square inch, for example, and in a particular embodiment, constructed in accordance with the present invention, a mesh having 90,000 openings per square inch was utilized. In this mesh the openings are about .002 inch in transverse dimension and the separating ribs are about .001 inch. The mesh in a readily available form is about .005 inch thick so that the supporting mesh is 2½ times as thick as the transverse dimensions of the openings.

Figure 4:
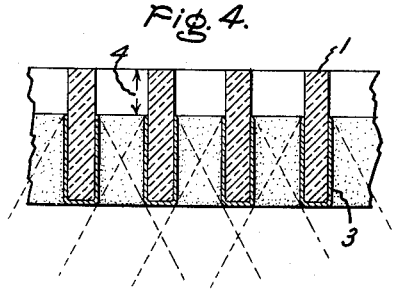
Figs. 4 and 5 are enlarged elevational views in section of a portion of the target electrode assembly, illustrating the steps in its manufacture.

The time constant desired for a given storage membrane is attained by proper spacing between the storage membrane and the adjacent surfaces of the mesh electrode 3. This is accomplished in accordance with a preferred method of making the device of the present invention by directively evaporating the metal of the mesh electrode onto the glass mesh, so that it terminates a predetermined distance from the membrane 2. The directive evaporation is illustrated schematically in Fig. 4, the direction of travel of the deposited metal vapor being indicated by the dotted lines and is so chosen that the space 4 is of the desired amount. In a particular target constructed, this distance is approximately .002 inch. If the glass mesh is about .002 inch, for example, it will be apparent that the metal mesh electrode need not extend into the openings of the glass mesh but may be applied to the side opposite the magnesium oxide film. Any suitable metal may be used for this mesh electrode but either gold or silver is particularly well suited for evaporation and adhering to the glass support.

Figure 5:
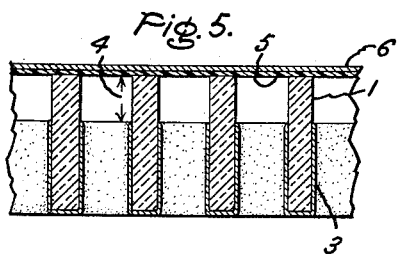

The magnesium oxide membrane 2 may then be applied to complete the electrode. In accordance with a preferred method of forming the thin magnesium oxide layer on the side of the mesh opposite the electrode 3, this side of the mesh is first provided with a thin supporting layer which may be removed upon subsequent heating. A suitable thin layer of nitrocellulose illustrated at 5 in Fig. 5 is applied by dropping onto the surface of a pan of water a small quantity of nitrocellulose dissolved in an organic solvent such as amyl acetate. This solution spreads out into a thin film because of the surface tension and the solvent evaporates, leaving a plastic film. The mesh which is placed in the water, either prior to the formation of the film or which is immersed into the water around the outside of the film is then raised gently to pick up the film on the surface of the mesh.

After this film has dried completely, the mesh is placed in an evaporator and a thin coating of magnesium evaporated on the plastic film as shown at 6 in Fig. 5. The thickness of the magnesium evaporated is determined by the desired mechanical and electrical characteristics of the storage electrode. In the particular embodiment, the film of magnesium is about 500 angstroms thick. At this stage the structure which appears as shown in Fig. 5 is placed in an oven and baked out in air at about 400° C. for a period in the order of five hours. This baking decomposes and volatilizes the nitrocellulose film which disappears completely and reduces the magnesium to an oxide, forming a smooth transparent magnesium oxide film or membrane. With a magnesium oxide film thickness of 500 angstroms, the time constant of the storage electrode structure is essentially the same as that obtained with the glass target electrode structure now used and is suitable for a repetition rate of 30 frames per second used in television. The time constant increases as the thickness of the magnesium oxide film increases and information storage may be realized with magnesium oxide films of a thickness in the order of several thousands of angstroms. Magnesium oxide prepared in accordance with the preferred method is glass-like in appearance and is homogeneous compared with the powdered magnesium oxide film often used in electron tubes. The films of the present invention are self-supporting in the sense that, when mounted, they are available on both sides for the reception of electrons, giving a double-sided target or storage structure. In the construction of thick targets, a laminated structure, of more than one film of magnesium oxide may be used, if desired.

Although the preferred form of my invention involves the use of the magnesium oxide membrane on a relatively rigid supporting mesh such as a glass mesh 1, it will be appreciated that in its broader aspects the invention may involve support of the magnesium oxide film on a more conventional target electrode support. In such a case, however, the elimination of unwanted microphonics may not be realized.

Figure 1:
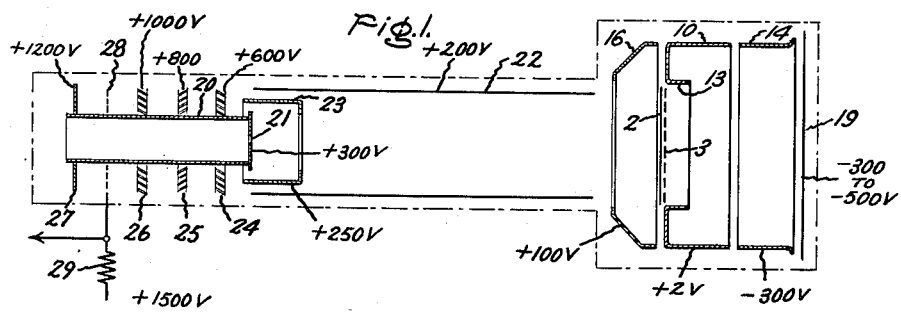
Figure 2:
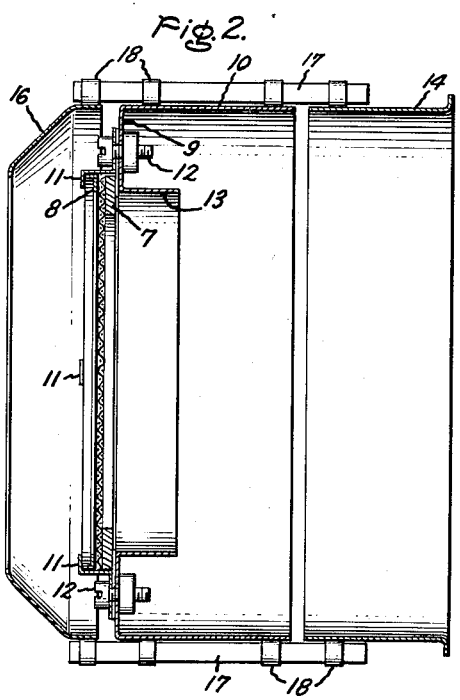
Fig. 2 is an enlarged elevational view in section, showing the electrode assembly, including the target electrode, of the image section of the tube shown in Fig. 1.

Referring now to Fig. 2, the target electrode assembly of Fig. 3 is supported from its periphery between an annular ring 7 and a ring 8 of angular cross section, having an upstanding flange portion extending to the left. This assembly is clamped against an inturned flange 9 of a cylindrical mesh supporting electrode 10 by means of a plurality of sheet metal clamps 11 which engage the flange at 8 and are held against the inturned flange 9 by means of suitable holding bolts 12. The target electrode is supported opposite the opening in a cylindrical flange 13 formed integrally with flange 9 and forming a part of the mesh supporting electrode 10. The latter electrode forms a part of an assembly including an accelerating electrode 14 and a decelerating electrode 16. These three electrodes are supported relative to one another by suitable ceramic rods or stalks 17 spaced around the circumference of the electrodes and are held thereto by suitable straps 18. This assembly is supported in the enlarged image section of the tube shown in Fig. 1 with the accelerating electrode 14 spaced slightly from a photocathode 19 which provides a source of photoelectrons. The photoelectrons are accelerated toward the target electrode to establish the charge pattern thereon in accordance with the image falling on the photocathode. At the opposite end of the tube is the electron gun and electronmultiplier structure which are concentrically arranged. The gun, which provides the scanning beam, is shown merely as a hollow cylindrical electrode 20, having a small aperture 21 in the order of .002 inch in diameter in the end wall thereof, for producing a fine scanning beam. The outer surface of this end wall surrounding the aperture also provides the first dynode of the electronmultiplier as will be described in more detail hereinafter. A cylindrical electrode which may be formed as a metallic coating 22 on the neck of the tube provides for focusing the beam and the field controlling electrode 16, usually designated a decelerating electrode. As will be readily appreciated by those skilled in the art, the entire camera tube is subjected to an essentially homogeneous longitudinal collimating magnetic field. This field may have a strength of 75 gauss, for example. Electrons from the scanning beam are collected in accordance with the charge or potential pattern established on the target so that returned electrons, which are the forward beam electrons minus those collected, vary with the charge pattern on the target 2. These electrons do not re-enter the aperture 21 but rather strike the plate surrounding the aperture, which is a good secondary emitter so that there is a multiplication of the electrons emitted compared with those returned from the storage electrode.

A generally cylindrically focusing electrode 23 for the electronmultiplier section of the tube is supported at the end of the gun electrode 20 intermediate that electrode and the beam focusing electrode 22.

Several stages of electron multiplication are provided by electrodes 24–27 inclusive and the amplified electron current is collected by the anode 28 of the electronmultiplier to produce a signal across the resistor 29 which varies in accordance with the charge pattern on the membrane 2. In Fig. 1 of the drawing, suitable direct current operating voltages for the various electrodes have been indicated. These voltages are relative to the cathode and may vary appreciably from the values given.

When the target electrode is scanned by an electron beam, the variation in beam current collected by the anode 28 reproduces point-by-point an electrical signal varying in accordance with a charge pattern on the target electrode. The time constant of the membrane determines the frame speed at which the device will operate, since it is essential that the residual charge from one frame to another be so small as not to interfere with the production of an electrical signal indicative of the image falling on the photocathode in any particular frame.

With the magnesium oxide film, the electrical characteristics remain relatively constant over extended life of the membrane. The difficulty resulting from what is generally understood to be a depletion of the mobile ions in the glass membrane is eliminated. The magnesium oxide film provides a target which is available on both faces for the impingement of electrons and is more sensitive (is a better secondary emitter) than the glass membrane. Also, the structure of the present invention provides for a relatively rigid membrane supported from the glass mesh so that problems due to microphonics are minimized. In this, the present invention is related to the copending application S.N. 630,682, filed Dec. 26, 1956, now U.S. Patent No. 2,879,419 granted March 24, 1959 and assigned to the assignee of the present invention, in which a generic embodiment of a relatively rigid membrane supported from a nonconducting mesh is described and claimed.

While we have described a particular embodiment of our invention, it will be apparent to those skilled in the art that changes and modifications may be made without departing from our invention in its broader aspects and we aim therefore in the appended claims to cover all such changes and modifications as fall within the true spirit and scope of our invention.

What we claim as new and desire to secure by Letters Patent of the United States is:

1. A target electrode assembly for establishing a point-by-point charge pattern corresponding to information to be converted to electrical signals by an electron beam scanning one side of said target electrode comprising a rigid glass mesh structure, a metallic electrode overlying one side of said mesh structure, and a magnesium oxide membrane overlying said opposite side of the mesh structure.

2. A target electrode assembly for establishing a point-by-point charge pattern corresponding to a visual image to be converted to electrical signals by an electron beam scanning one side of said target electrode comprising a rigid insulating mesh structure, a metallic electrode overlying one side of said mesh structure, and an oxidized magnesium membrane overlying the opposite side of said insulating mesh structure.

3. A target electrode for establishing a point-by-point charge pattern in accordance with information to be converted to an electrical signal by scanning said target with an electron beam, said electrode comprising a supporting mesh having a large number of openings therethrough, an electrode on one face of said mesh having openings therein overlying the openings in said mesh and a magnesium oxide membrane having a thickness in the order of several thousand angstroms supported on the opposite side of said mesh.

4. A target electrode for establishing a point-by-point charge pattern in accordance with information to be converted to an electrical signal by scanning said target with an electron beam, said electrode comprising a mesh electrode and a storage membrane of homogeneous magnesium oxide supported in closely spaced relation to said mesh electrode and having a thickness in the order of five hundred to several thousand angstroms.

5. A two-sided target electrode for a camera tube in which a charge pattern corresponding point-by-point with the image to be converted into an electrical signal is established on one side of said target electrode and in which an electron beam is deflected over the other side of said target electrode to deposit electrons thereon as a function of the charge pattern on said one side, said target electrode comprising an imperforate transparent storage membrane of magnesium oxide having a thickness in the order of 500 angstroms.

6. A two-sided target electrode for a camera tube in which a charge pattern corresponding point-by-point with the image to be converted into an electrical signal is established on one side of said target electrode and in which an electron beam is deflected over the other side of said target electrode to deposit electrons thereon as a function of the charge pattern on said one side, said target electrode comprising an imperforate storage membrane of homogeneous magnesium oxide, the thickness of said membrane being in the order of five hundred to several thousand angstroms whereby a much lower resistivity exists in a direction of the thickness of said membrane than in a direction transverse to the thickness of said membrane.

References Cited in the file of this patent

UNITED STATES PATENTS

| | | |
|---|---|---|
| 2,266,595 | Fraenckel | Dec. 16, 1941 |
| 2,506,741 | Rose | May 9, 1950 |
| 2,544,754 | Townes | Mar. 13, 1951 |
| 2,607,903 | Labin | Aug. 19, 1952 |
| 2,754,449 | Farnsworth | July 10, 1956 |
| 2,776,387 | Pensak | Jan. 1, 1957 |
| 2,784,123 | Rappaport | Mar. 5, 1957 |
| 2,851,624 | Sheldon | Sept. 9, 1958 |